United States Patent [19]
Hall

[11] Patent Number: 5,386,787
[45] Date of Patent: Feb. 7, 1995

[54] SLIDABLE WORK SURFACE SYSTEM

[76] Inventor: Donald M. Hall, P.O. Box 1247, Progress St., Kingston, N.Y. 12401

[21] Appl. No.: 24,010

[22] Filed: Mar. 1, 1993

[51] Int. Cl.$^6$ .............................................. A47B 11/00
[52] U.S. Cl. ...................................... 108/143; 108/42
[58] Field of Search .................. 108/149, 143, 42, 47, 108/48, 61, 102, 137; 312/122, 281, 317.3; 211/162, 175; 52/29

[56] References Cited

U.S. PATENT DOCUMENTS

| | | | |
|---|---|---|---|
| 978,299 | 12/1910 | Jacobs . | |
| 1,208,979 | 12/1916 | Kahre | 108/143 X |
| 1,259,167 | 3/1918 | Ticheli . | |
| 1,298,672 | 4/1919 | Davis et al. | 108/143 |
| 1,897,957 | 2/1933 | Rossebo et al. . | |
| 1,992,106 | 2/1935 | Wee . | |
| 2,074,870 | 3/1937 | Starr et al. . | |
| 3,067,882 | 12/1962 | Ribbens et al. . | |
| 4,335,547 | 6/1982 | Maxwell | 52/29 X |
| 4,392,629 | 7/1983 | Dallman . | |

FOREIGN PATENT DOCUMENTS

| | | | |
|---|---|---|---|
| 247696 | 12/1911 | Germany | 108/143 |
| 695617 | 9/1965 | Italy | 108/143 |

Primary Examiner—Jose V. Chen
Attorney, Agent, or Firm—Shlesinger, Arkwright & Garvey

[57] ABSTRACT

The slidable work surface system includes a frame, a support member disposed on the frame, a work surface member provided on the support member, and a brake located between the frame and the support member. The brake has an engaged and a disengaged position, and restricts movement of the support member relative to the frame when the brake is in its engaged position. Another embodiment of the device includes a slidable work surface system having a display case associated therewith.

19 Claims, 5 Drawing Sheets

SLIDABLE WORK SURFACE SYSTEM

FIELD OF THE INVENTION

This invention relates to a movable work surface mounting system. It should be understood that the inventive system can be used to movably mount tables, machinery supports, tools, and the like.

BACKGROUND OF THE INVENTION

There are known devices by which an operator can move a work surface relative to himself or herself or relative to another object.

Traditional movable supports for carrying heavy machinery have been bulky, complicated, and unwieldy.

In the retail trade, such as in grocery stores, delicatessens, and bakeries, in particular, there is a need for a slidable work surface system which has a narrow profile, is simple to operate, is easy to construct, and is readily disassembled for cleaning.

U.S. Pat. No. 1,259,167 to Ticheli discloses a slidably mounted weighing scale movable along a pair of track rails located on the flat top surface of a store counter and is supported thereby. The Ticheli sliding weighing scale is located substantially in the middle of the store counter between the area where customers stand in front of the store counter and where personnel would stand behind the counter. The location of the Ticheli scale is a compromise between an easily accessible, ergonomically correct location for either customers or personnel, when their physical needs are considered individually. The Ticheli sliding scale is not easily cleaned, and runs along track rails which are unsatisfactory from the standpoint of modern sanitation and hygiene requirements.

U.S. Pat. No. 978,299 to Jacobs discloses a slidable optical table carried on horizontally spaced apart rails by two pairs of rollers. The Jacobs table is bulky, especially owing to its relatively wide table carrying member.

U.S. Pat. No. 4,392,629 to Dallman discloses a mounting system particularly suited for mounting refrigeration units on walls which are made of foamed-in-place panels. The Dallman system includes a horizontally extending rack fastener which mounts on the top of a horizontal support surface and which has an upwardly extending lip configured to be flush with the vertical face of a wall on which a refrigeration unit is to be hung. The main mounting rack of the Dallman system is essentially a large, open frame having vertical and horizontal legs tied together by braces extending from the free ends of the legs. The refrigeration unit supporting rack itself is stationary, and is held in place relative to the horizontal rack fastener by a downwardly extending lip which mates with the upwardly extending lip of the rack fastener. Accordingly, the weight of the support rack and the refrigeration unit contained thereon is distributed over a large area of the wall panel.

The use of the term "work surface" is for convenience only, as all types of supporting surfaces, tables, racks, and the like are intended to be within the scope of the invention.

OBJECTS AND SUMMARY OF THE INVENTION

It is a first object of the invention to provide a work surface mounting system which overcomes the drawbacks of existing devices.

Another object of the invention is to provide a slidable work surface system which is quicker to install than known devices.

Yet another object of the invention is to provide a slidable work surface system which is easier to clean and, hence, more hygienic than existing systems.

Another object of the invention is to provide a slidable work surface system which may be installed either as a free standing system or as a fixed system attached to another object.

A still further object of the invention is to enhance worker efficiency.

Yet another object of the invention is to provide a slidable work surface system which leads to increased customer contact and, accordingly, increased sales when the system is used in a retail environment.

Still another object of the invention is to provide a slidable work surface system having individual components which are readily removed for maintenance and cleaning, as well as being readily removed in its entirety for cleaning of the area of installation.

Another object of the invention is to provide a slidable work surface system which has a narrow profile requiring little floor space when installed, in use, and at rest.

It is yet another object to provide a slidable work surface system which can withstand the large reciprocating forces induced by the back and forth movement of conventional delicatessen slicers.

Still another object of the invention is to provide a slidable work surface system which precisely guides a moving work surface without the use of slots or troughs, so as to eliminate dirt collection sites which are unhygienic.

Another object of the invention is to provide a floor mounted movable work surface system which can be readily expanded to include additional components.

Yet another object of the invention is to provide a floor mounted slidable work surface system having sufficient clearance so that the floor area beneath the system is readily cleaned, and so that utilities, such as electric cords, can be run between a display case and utility outlets without the need to modify the system.

In summary, therefore, the invention is directed to slidable work surface systems which are hygienic, operate easily, accurately, and in confined spaces.

In one embodiment of the invention the slidable work surface system includes a frame, a support member disposed on the frame, a work surface member provided on the support member, and a brake located between the frame and the support member. The brake has an engaged and a disengaged position, and restricts movement of the support member relative to the frame when the brake is in its engaged position.

Another embodiment of the device according to the invention includes a slidable work surface system having a display case associated therewith.

The invention will be further described with reference to the following drawings.

DETAILED DESCRIPTION OF THE INVENTION

Figure 1:
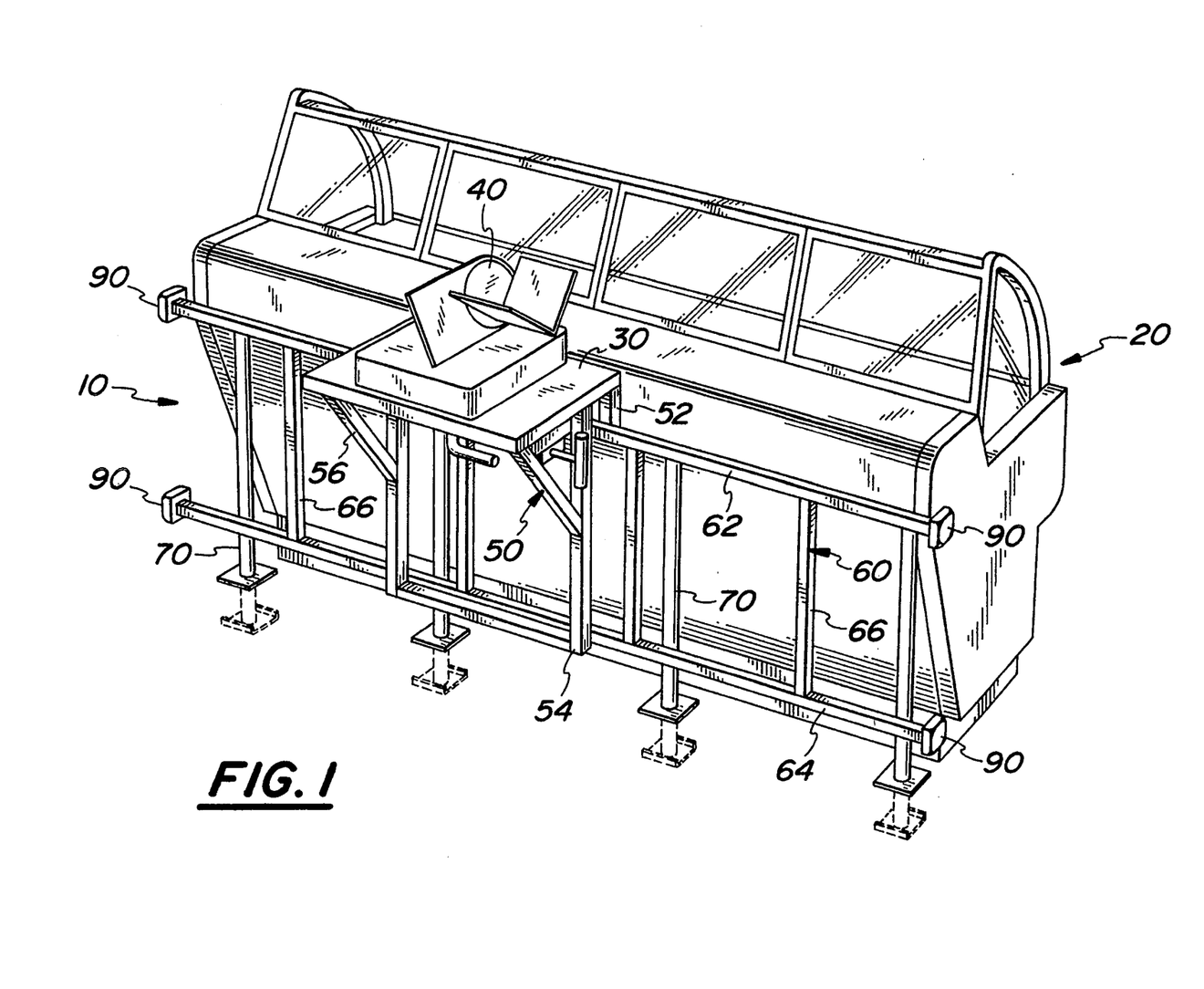
FIG. 1 is a perspective view of a device incorporating a movable work surface mounting system associated with a display case according to the invention.
Figure 2:
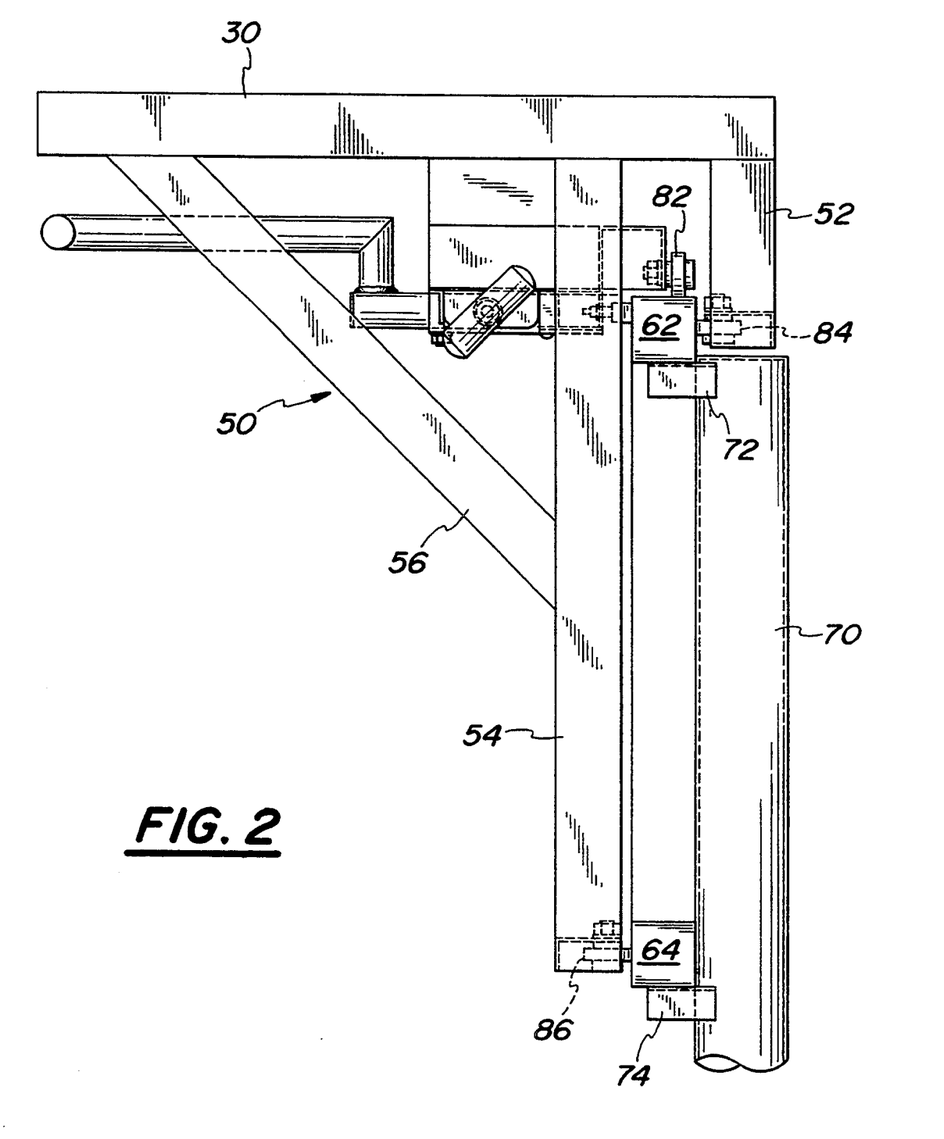
FIG. 2 is a partial side view of the movable work surface mounting system of FIG. 1 according to the invention.
Figure 3:
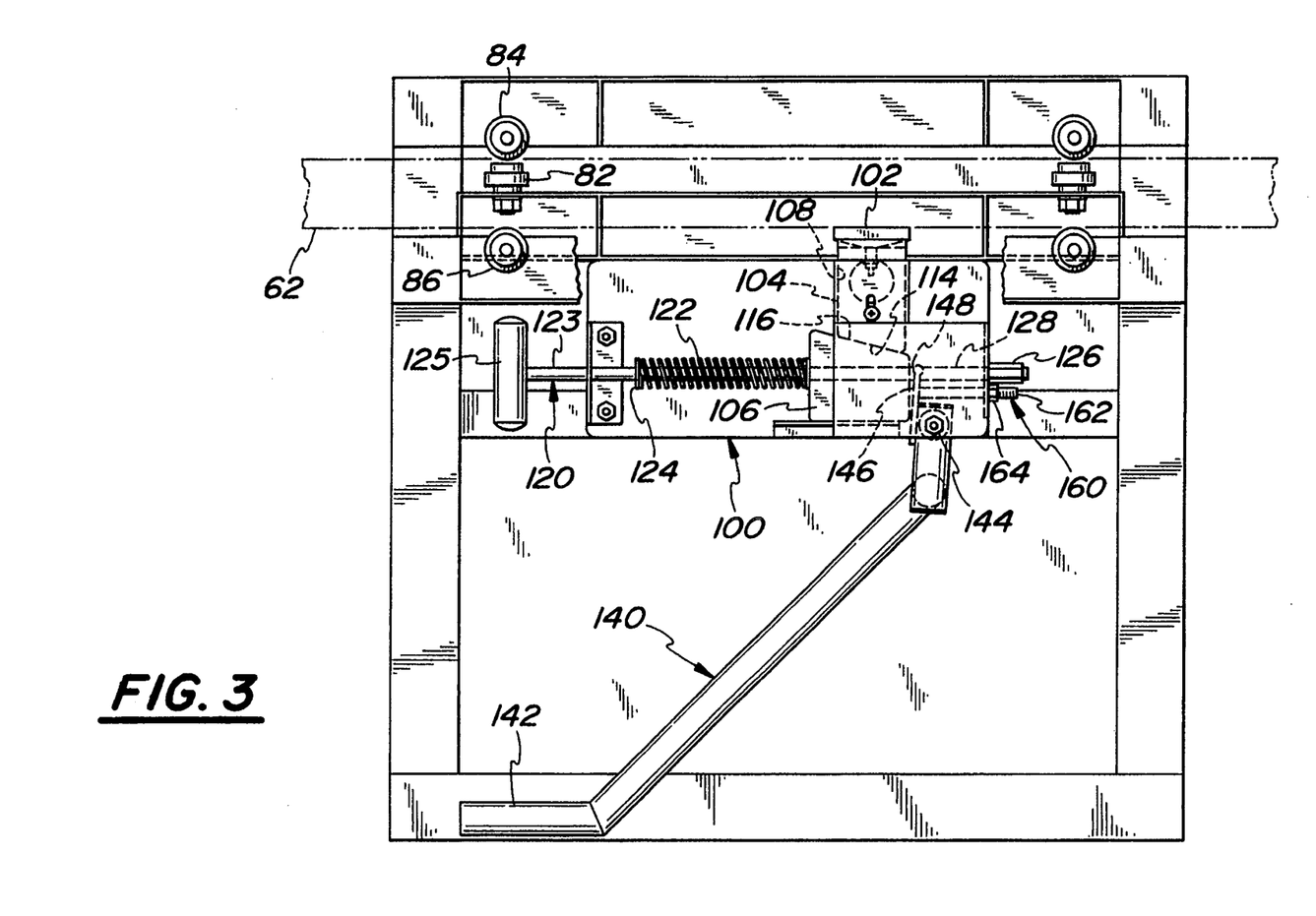
FIG. 3 is a plan view, taken from below, of the movable work surface; mounting system shown in FIG. 2.

Turning to FIGS. 1-3, a first preferred embodiment of a movable work surface mounting system 10 according to the invention is shown.

In a typical application, work surface mounting system 10 is associated with a display device 20 such as a conventional delicatessen case. A work surface member or supporting table 30 typically extends substantially horizontally and supports a piece of machinery 40, such as a slicer, as shown. A support member or slidable frame 50 is disposed between work surface member 30 and a substantially vertical frame 60 for allowing work surface member 30 to move relative thereto.

Frame 60 includes an upper rail or track 62 along with a vertically spaced apart and substantially parallel lower rail or track 64. A plurality of vertical spacers 66 maintains the spacing between upper rail 62 and lower rail 64, as well as serving to strengthen frame 60.

One or more vertically extending uprights or main support members 70 carry frame 60 and support the remainder of slidable work surface mounting system 10 above the floor. Spaced apart upper and lower ears 72 and 74, respectively, are attached to a front part of upright 70. Upper rail 62 is supported by upper ears 72 and lower rail 64 is supported by lower ears 74.

One or more upper, vertically oriented rollers 82 are attached to support member 50 for movably supporting support member 50 relative to upper rail 62, hence, frame 60, as well as for transmitting vertical forces from work surface member 30 and objects carried thereon to frame 60.

In order to transmit substantially horizontal forces from work surface member 30 and support member 50 to frame 60, one or more upper, horizontally oriented rollers 84 are provided along a rear portion of slidable frame 50 for engaging upper rail 62 in order to transmit substantially horizontal forces thereto.

In addition, one or more lower, horizontally oriented rollers 86 are attached along a lower portion of front leg 54 so as to transmit substantially horizontal forces from support member 50 to lower rail 64.

As will be readily appreciated, the configuration of slidable support member 50, taking into account the relative lengths and positions of rear leg 52, front leg 54, and diagonal brace 56 ensures that a large share of the horizontal forces resulting from the weight of slicer 40 placed on work surface member 30, for example, is transmitted ultimately through lower rollers 86 into lower rail 64 and, hence, a lower portion of upright 70. In this manner, a tendency of uprights 70 to be bent under heavy loads is reduced.

It should be likewise noted that the location and distribution of upper, vertical oriented rollers 82 along with upper, horizontally oriented rollers 84, as well as lower, horizontally oriented rollers 86 allows slidable support member 50 to be securely seated on frame 60, without any direct, fixed connection therebetween. This configuration results in support member 50 being readily completely removed from frame 60 for ease of servicing.

A brake assembly 100, shown in greater detail in FIG. 3, includes a brake pad 102 configured for engaging upper rail 62 for restricting relative movement between slidable support member 50 and frame 60. Brake pad 102 is carried by a primary brake shoe 104 and is releasably attached thereto by conventional fasteners. A secondary brake shoe 106 is normally engaged with primary brake shoe 104. A primary brake shoe casing 108 houses and guides primary brake shoe 104. Secondary brake shoe 106, as well as other components of brake assembly 100, are likewise appropriately housed and guided, as will be readily appreciated by a person having ordinary skill in the art.

An angled face 114 of primary brake shoe 104 engages a complementary angled face 116 of secondary brake shoe 106. Angled faces 114 and 116 are selected so as to multiply the force exerted by an adjustable tensioning member 120 owing to its associated spring 122.

The movement of spring 122 is restrained relative to an elongated rod 123 by means of a washer or stop member 124.

A handle 125 is attached to one end of rod 123. A threaded coupling nut 126 is disposed at the end of rod 123 opposite from handle 125 and engages a threaded end 128 of rod 123.

A brake release 140 having a handle 142 is pivotally attached to the remainder of brake assembly 100 by a pivot member 144. A throw rod 146 associated with handle 142 has a rounded contact member 148 located at a distance from handle 142 and pivot member 144. The rounded contact member 148 engages secondary brake shoe 106.

An adjustable stop member 160 includes a threaded rod 162 and a mating, internally threaded nut 164 associated therewith.

Figures 4, 5:
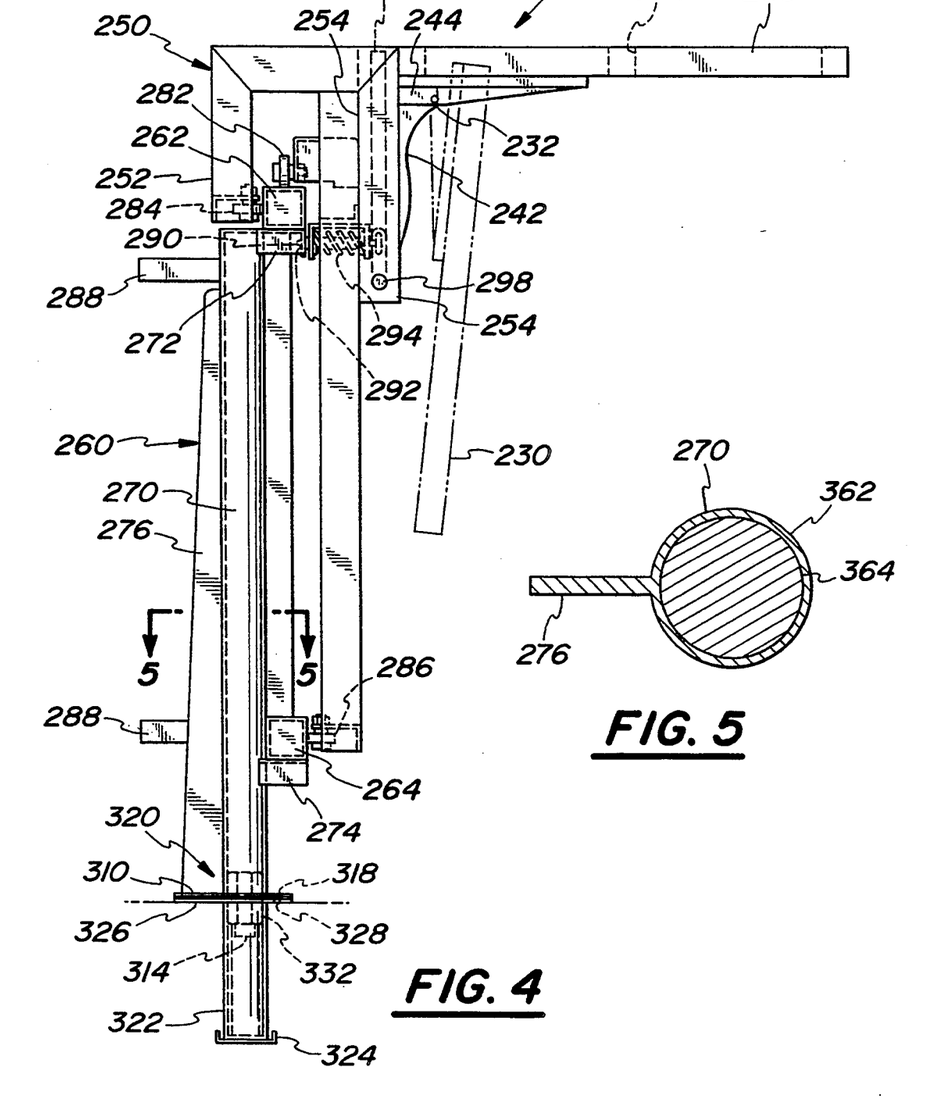
FIG. 4 is a side view of another preferred embodiment of a slidable work surface system according to the invention.
FIG. 5 is a cross-sectional view taken along line 5—5 shown in FIG. 4.

Turning to FIGS. 4 and 5, another preferred embodiment of a device according to the invention is shown. FIG. 4 illustrates a pivotable sliding table 200 having a work surface 230 and which is rotatably attached about a pivot member 232, and by a bracket 242 having a conventional locking mechanism 244, to a slidable support member or frame 250.

Slidable support member 250 includes a rear leg 252 and a downwardly extending front leg 254. A frame 260 includes an upper rail 262 and a vertically spaced apart lower rail 264. An upright member 270 supports upper rail 262 and lower rail 264 by means of an upper ear 272 and a lower ear 274, respectively.

A strengthening rib 276, which preferably has a substantially trapezoidal shape in profile, and which, in use, is preferably oriented so that it extends rearwardly away from work surface 230, extends along a portion of the length of upright 270.

It is likewise contemplated that upright 270 will be used with the slidable work surface mounting system embodiment of FIGS. 1-3.

Movement of slidable support 250 and, hence, work surface 230 relative to frame 260 is restricted by a pin 290 which engages a hole 292 formed in upper ear 272 (or formed in an appropriate horizontally extending cross member). A spring 294 associated with pin 290 biases spring 290 into engagement with hole 292. A handle attached to pin 290 is pivotally attached to a pivot member 298 at a distance from its attachment to pin 290.

An optional set of attaching members 288 may be used for fastening the slidable work surface mounting systems to an object, such as display case 20 of FIG. 1.

A number of apertures 304 are provided for receiving tools and accessories.

In a preferred embodiment of upright 270, a flat mounting flange 310 is attached at the bottom thereof. A threaded fastener is disposed near the bottom of upright 270. One or more holes are provided in mounting flange 310.

A floor socket 320 includes a section of pipe 322 and a C-shaped flange 324 attached to a lower portion thereof. A mounting plate 326 located at the upper end of pipe 322 is configured for mating with mounting flange 310.

One or more holes 328, which may be located for alignment with holes 318 of flange 310 when this embodiment is installed, are provided in mounting flange 326.

A threaded coupler 332 configured for mating with threaded fastener 314 is located at the upper end of floor socket 320.

Turning to FIG. 5, the cross-sectional view taken along line 5—5 of FIG. 4 shows a preferred construction of upright 270 that is particularly suited for carrying heavy loads. A stainless steel pipe 362 surrounds a preferably closely fitting carbon steel rod 364.

Figure 6:
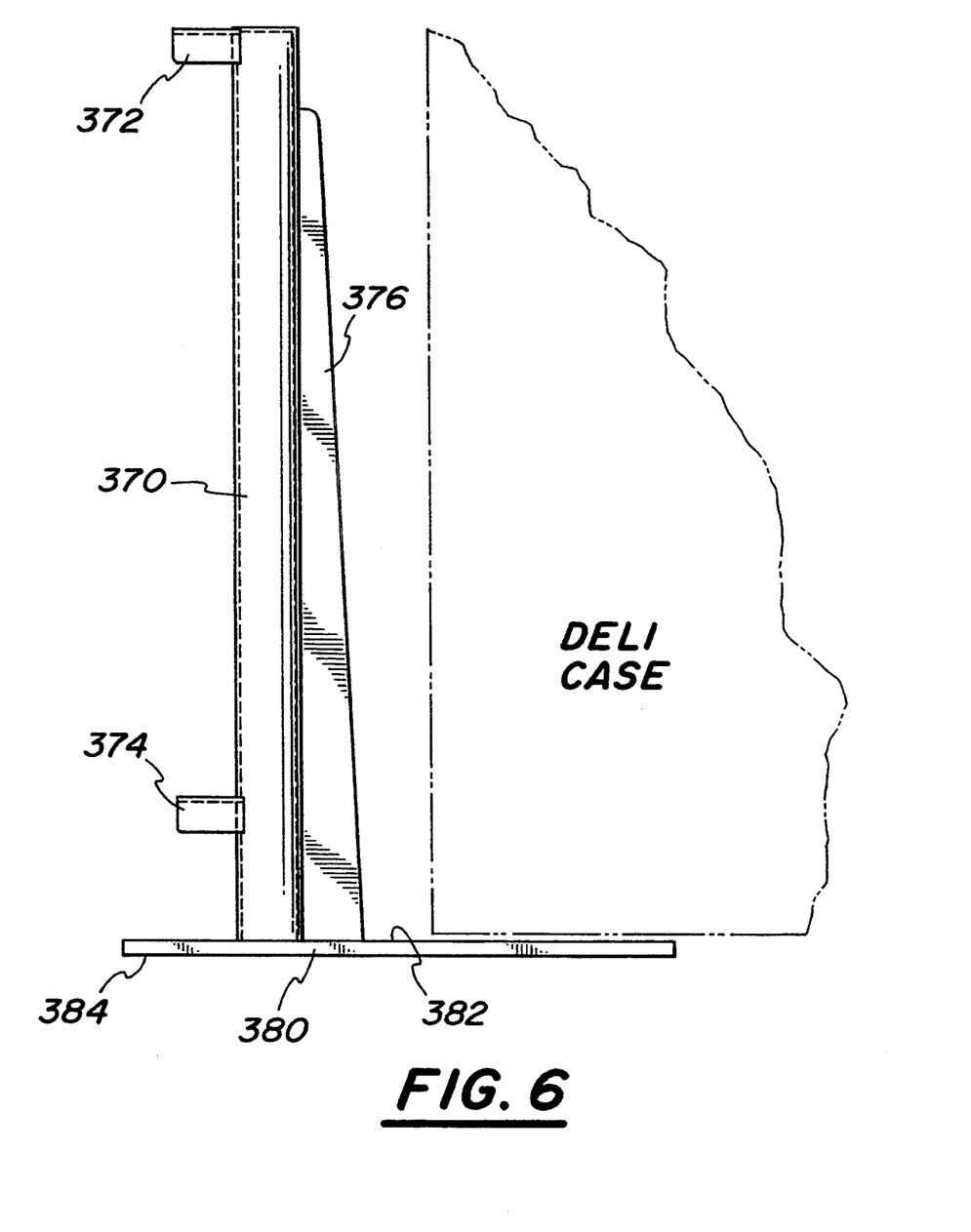
FIG. 6 is a schematic, partial side view of a still further preferred embodiment of the invention.

FIG. 6 illustrates a still further preferred embodiment of the invention.

An upright 370 is provided with an upper ear 372 and a lower ear 374 for supporting unillustrated upper and lower rails, respectively, as in the previous embodiments. Likewise, a strengthening rib 376 extends along a side of upright 370 which faces a deli case.

An elongated mounting flange or "duck foot" 380 is provided at the lower end of upright 370. Duck foot 380 is sufficiently long so that a deli case can be placed directly on a top surface 382 thereof. A bottom surface 384 simply contacts the floor on which the movable work surface mounting system is placed. This embodiment has the advantageous feature that no fixed connections are made between the floor and the system; i.e., duck foot 380.

OPERATION

In use, slidable work surface mounting system 10 is installed at a suitable distance from display case 20 and so that frame 60 extends substantially perpendicular to the supporting floor. If floor sockets 320 (FIG. 4) are used, a hole is drilled in the concrete floor, for example, floor socket 320 is inserted after a suitable grout or adhesive has been placed in the drilled hole, and the grout is allowed to harden.

Additional holes can be drilled in the concrete at the location of holes 328 in mounting plate 326, and lag bolts can be used for providing additional strengthening connections between mounting plate 326 and the concrete floor.

Then, uprights 70 are inserted in the holes, or in the case of uprights 270 of FIG. 4, threaded fasteners 314 are mated with threaded couplers 332 of the floor socket 320. If desired, fasteners can be inserted through both holes 318 and 328 and into the floor, after mounting flange 310 has been aligned with mounting plate 326.

After the installation of frame 60, slidable support 50 is placed on frame 60 by simply lowering support 50 from above, so that rear leg 52 and front leg 54 are disposed on opposite sides of upper rail 62. In that manner, upper, vertically oriented rollers 82 and upper, horizontally oriented rollers 84 engage upper rail 62, and lower, horizontally oriented rollers 86 engage the front face of lower rails 64, as seen in FIGS. 2 and 3. Work surface member 30 and objects carried thereon such as slicer 40, can now freely move substantially horizontally from left to right as viewed in FIG. 1.

Brake assembly 100 is normally engaged so that brake pad 102 contacts upper rail 62 and restricts movement of slidable support 50 relative to frame 60.

In order to adjust the braking force exerted by brake pad 102, the operator simply rotates handle 125, causing rod 123 to move relative to threaded coupling nut 126 by means of the engagement of threaded end 128 of rod 123. Accordingly, washer 124 compresses or releases spring 122, depending on the direction of rotation of handle 125, and respectively increases or decreases the spring force exerted thereby.

The force exerted by spring 122 causes angled face 116 of secondary brake shoe 106 to exert pressure against angled face 114 of primary brake shoe 104.

When work surface member 30 is to be moved to a different location, the operator rotates handle 142 of brake release 140 so that the pivoting movement about pivot 144 causes rounded contact member 148 to engage secondary brake shoe 106 and force brake shoe 106 away from primary brake shoe 104 against the force of spring 122. It has been found that primary and secondary brake shoes 104 and 106 are sufficiently smooth so that no spring is generally required for retracting primary brake shoe 104 and brake pad 102 away from upper rail 62 when the brake is released. Brake shoes 104 and 106 have been successfully fabricated from polyethylene blocks, such as POLSAN TM.

The braking force of brake pad 102 can be fine-tuned so that work surface member 30 does not move laterally during normal use, yet if an operator accidentally bumps against work surface member 30, slidable support 50 will move, overcoming the braking force exerted by brake pad 102, so that the operator has reduced likelihood of injury.

If desired, for certain working conditions, adjustable stop member 106 can be advanced against throw rod 146 for "locking out" brake release 140 so that the brake cannot be inadvertently released.

Stops 90, preferably fabricated of soft, resilient material, such as conventional rubber donuts, prevent slidable support 50 from moving past the free ends of upper and lower rails 62 and 64.

It is contemplated that stops 90 be removable, so that the slidable work surface mounting system 10 can be expanded to include two or more systems side by side; i.e., a second frame 60 would be adjoined by suitable coupling members, or by welding the free ends of upper and lower rails 62 and 64, respectively. A second display case 20, or a larger display case could then be added.

The operation of pivotable sliding table 200 of FIG. 4 is similar to the operation of the embodiment of FIGS. 1-3. Work surface 230 extends substantially horizontally when in normal use, and pivots downwardly about pivot member 232 into a substantially downwardly extending position (shown in phantom line) which gives the overall system a narrower profile when desired.

It is also contemplated that height and angle adjustment members be provided to compensate for uneven floors and for errors in installation. Such adjustment members may be added between the slidable frame and the frame or between the slidable frame and the work surface member, for example.

It is further contemplated that a series of rollers on tracks or on the guide rails may be used for guiding the slidable supports according to the invention, instead of the rollers being provided on the slidable support, as shown.

In addition, the number of rollers may be varied, depending on the environment of expect use.

It is likewise contemplated that additional frame supports, and/or clamping of the upright frame to walls or display cases may be utilized when heavier loads are expected.

Accessories, such as paper towel dispensing equipment racks, glove dispensers, and the like, may be added to the moveable work surface so that such accessories are readily available to the operator.

It is further envisioned that self-aligning wheels be used instead of, or in conjunction with, the above-described rollers, in order to compensate for variations in the rail; i.e., a tensioning member, for example, would keep such self-aligning wheels normally engaged with the rail.

It is likewise contemplated that curved rails in conjunction with appropriately curved slidable frames be used in applications where bends are prevalent in the system, such as around a display case having a circular profile.

In addition, carbon steel tubes may be used in place of the solid carbon steel bar inserts for strengthening the uprights.

Furthermore, it is likewise contemplated that tapered roller bearings be used in place of the rollers. Similarly, tapered blocks of plastic can be substituted for the rollers where a less expensive sliding element between the working table and the basic frame is desired.

In addition, it is envisioned that vibration isolators/dampers be provided between the guide rails and the uprights or posts for reducing the vibrations resulting from the reciprocation of a slicer placed on the working surface.

A low profile movable work surface mounting system is contemplated in which adjustable height rails are provided to allow for locating the rails at heights suitable for allowing access to doors in the rear of a delicatessen case, for example.

There may also be provided a case-mounted system in which the entire mounting system is carried by the display case with which it is associated. In this manner, with no connections between the movable work surface mounting system and the floor, it is easy to maintain hygiene by providing for freely accessible cleaning underneath the work surface mounting system. An additional benefit is that the mounting of the movable work surface mounting system entirely on the associated display case makes it easier to align the mounting system with the display case.*

*This configuration can also be fitted with adjustable feet for each of the vertical struts. These feet contact the floor and provide load-bearing support.

Furthermore, it is contemplated that additional work surfaces be provided, such as polyethylene plastic "slide-outs" or work surfaces which extend parallel to and beneath the normal stainless steel work surface to provide an auxiliary working area.

In addition, it is contemplated that one or more shelves be provided below the work surface. It is likewise envisioned that the uprights may be either round stainless steel tubing or other suitable material or square tubing.

A travelling platform sufficiently strong to carry the weight of workers and which travels near to the floor on which the system is installed, is contemplated for use by shorter employees, or employees in work situations which demand such a movable platform.

As will be readily appreciated by a person having ordinary skill in the art, a splash guard for protecting the associated display case from flying residue generated at the work surface may be installed.

It is further contemplated that the work surface/table be height adjustable.

As required, the working surface/table may have rounded edges or be made of any other materials suitable for the work site.

It is also contemplated that a working surface/table be provided which is sufficiently long to extend over a part of the associated display case, or over the top of the display case.

Instead of the above-described "duck foot", above floor couplings may be provided; that is, a flange or a plate with a threaded attachment or fastener may be placed on the floor to receive a mating threaded coupling on an upright. Such above floor couplings will typically be round and have a surface area for contacting the floor of about five to six square inches. Similarly, above floor plates which include castings having recessed cavities therein for receiving hardware may be used in a similar manner. Such above floor plates would typically have a surface area contacting the supporting surface of about 12 square inches.

While this invention has been described as having a preferred design, it is understood that it is capable of further modifications, uses and/or adaptations of the invention following in general the principle of the invention and including such departures from the present disclosure as come within the known or customary practice in the art to which to invention pertains and as may be applied to the central features hereinbefore set forth, and fall within the scope of the invention and of the limits of the appended claims.

What is claimed is:

1. A movable work surface mounting system comprising:
   a) a frame;
   b) a support member slidably disposed on said frame;
   c) a work surface member provided on said support member;
   d) a brake disposed between said frame and said support member;
   e) said brake having an engaged and a disengaged position;
   f) said brake restricting movement of said support member relative to said frame when said brake is in its engaged position;
   g) an upper track is disposed on said frame;

h) an upper roller is disposed on said support member;
i) said upper roller engages said upper track and is oriented for transmitting substantially only vertical forces from said support member to said upper track;
j) a lower track is disposed on said frame;
k) a lower roller is disposed on said support member; and
l) said lower roller engages said lower track and is oriented for transmitting substantially horizontal forces from said support member to said lower track.

2. A movable work surface mounting system as defined in claim 1, wherein:
a) said support member is detachably attached to said frame.

3. A movable work surface mounting system as defined in claim 1, wherein:
a) said support member is free of connections between said frame and said support member.

4. A movable work surface mounting system as defined in claim 1, wherein:
a) said frame extends substantially vertically and has an upper part and a lower part;
b) a first leg is provided on said support member;
c) said first leg extends away from said work surface member and adjacent to said upper part; and,
d) a second leg is provided on said support member and extends away from said work surface member and adjacent to said lower part.

5. A movable work surface mounting system as defined in claim 11, wherein:
a) said second leg is longer than said first leg.

6. A movable work surface mounting system as defined in claim 1, wherein:
a) said work surface member is pivotally attached to said support member.

7. A movable work surface mounting system as defined in claim 1, wherein:
a) a display case is operably associated with said frame.

8. A device, comprising:
a) a display case;
b) a frame associated with said display case;
c) a support member slidably disposed on said frame;
d) a work surface member provided on said support member;
e) a brake disposed between said frame and said support member;
f) said brake having an engaged and a disengaged position;
g) said brake restricting movement of said support member relative to said frame when said brake is in its engaged position;
h) an upper track is disposed on said frame;
i) an upper roller is disposed on said support member;
j) said upper roller engages said upper track and is oriented for transmitting substantially only vertical forces from said support member to said upper track;
k) a lower track is disposed on said frame;
l) a lower roller is disposed on said support member; and
m) said lower roller engages said lower track and is oriented for transmitting substantially horizontal forces from said support member to said lower track.

9. A device as defined in claim 8, wherein:
a) said frame is attached to said display case.

10. A device as defined in claim 8, wherein:
a) a brake tensioner is associated with said brake for varying a force with which said brake restricts movement of said support member relative to said frame.

11. A device as defined in claim 8, wherein:
a) an upright is associated with said frame;
b) said upright has upper and lower ends; and,
c) a removable socket configured for engaging a floor is provided on said lower end.

12. A device as defined in claim 8, wherein:
a) said support member is free of direct mechanical connections between said frame and said support member; and
b) said support member is configured for being freely disengageable from said frame when said support member is moved substantially vertically in a direction away from said lower track toward said upper track.

13. A device as defined in claim 12, wherein:
a) a further, upper roller is disposed on said support member; and
b) said further, upper roller engages said upper track and is oriented for transmitting substantially horizontal forces from said support member to said upper track.

14. A device as defined in claim 17, wherein:
a further, upper roller is disposed on said support member; and
b) said further, upper roller engages said upper track and is oriented for transmitting substantially horizontal forces from said support member to said upper track.

15. A movable work surface mounting system comprising:
a) a frame;
b) a support member slidably disposed on said frame;
c) a work surface member provided on said support member;
d) a brake disposed between said frame and said support member;
e) said brake having an engaged and a disengaged position;
f) said brake restricting movement of said support member relative to said frame when said brake is in its engaged position;
g) an upper roller disposed between and operatively associated with said frame and said support member;
h) a lower roller disposed between and operatively associated with said frame and said support member;
i) said lower roller being vertically spaced from said upper roller;
j) said support member and said-frame being free of direct mechanical connections therebetween; and
k) said support member being configured for being freely disengageable from said frame when said support member is moved substantially vertically relative to said frame.

16. A movable work surface mounting system as in claim 15, wherein:
a) a further, upper roller is disposed on said support member; and
b) said further, upper roller engages said upper track and is oriented for transmitting substantially horizontal forces from said support member to said upper track.

17. A movable work surface mounting system as defined in claim 1, wherein:
 a) said support member is free of direct mechanical connections between said frame and said support member; and
 b) said support member is configured for being freely disengageable from said frame when said support member is moved substantially vertically in a direction away from said lower track toward said upper track.

18. A movable work surface mounting system as defined in claim 17, wherein:
 a) a further, upper roller is disposed on said support member; and
 b) said further, upper roller engages said upper track and is oriented for transmitting substantially horizontal forces from said support member to said upper track.

19. A movable work surface mounting system as defined in claim 1, wherein:
 a) a further, upper roller is disposed on said support member; and
 b) said further, upper roller engages said upper track and is oriented for transmitting substantially horizontal forces from said support member to said upper track.

* * * * *